April 30, 1957     J. E. SNYDER     2,790,286
SECONDARY CLOSURES
Filed May 11, 1953

*INVENTOR.*
JAMES E. SNYDER
BY
*R. L. Miller*
ATTORNEY

United States Patent Office 2,790,286
Patented Apr. 30, 1957

2,790,286

SECONDARY CLOSURES

James E. Snyder, Akron, Ohio, assignor, by mesne assignments, to The Goodyear Tire & Rubber Company, a corporation of Ohio Application May 11, 1953, Serial No. 353,960

5 Claims. (Cl. 53—41)

This invention relates to secondary closures and their use.

Secondary closures are used around the necks of bottles and other containers, over the primary closures, as, for example, on liquor bottles and bottles of pharmaceuticals, etc. The secondary closures are so constructed that they must be damaged or destroyed when the container is opened, and are intended to assure the ultimate consumer that the contents of the container have not been tampered with.

The secondary closure of this invention is a band closure and is formed of elastomer which has been stretched or oriented in the direction of the circumference of the band. When subsequently heated, the oriented heat-shrinkable band shrinks onto the neck of the bottle or other container on which the secondary closure is used. To render the secondary closure tamper-proof, it is treated with a swelling agent which on subsequent heating firmly bonds the closure to the neck of the container. The swelling agent may be volatile at room temperature or on heating, or it may dry by penetration into the film.

The secondary band closure of this invention is stretched circumferentially of the neck of the bottle or other container when it is applied thereto. It may be formed of stretched film or the formed closure may be stretched. For instance, it may be made by wrapping unstretched film several times around a mandrel and then stretching the film, or it may be made of a single ply of film which is subsequently stretched. Any suitable method of manufacturing the stretched band may be employed.

The band closure is not shrunk more than several percent of its area in being shrunk into place on the neck of the container. Nevertheless, it is desirable that the film of which the band is composed be stretched to at least 50 percent and preferably to as much as 350 percent or more of its original area. Then on heating, the band shrinks onto the neck of the container, but without removing all of the stretch from the film. The film in the final package remains stretched to a considerable percentage and this tends to hold the secondary closure tight on the neck of the bottle.

The invention will be illustrated in the drawings in connection with the use of a secondary band closure of rubber hydrochloride on a bottle. Any suitable elastomer may be used, as, for example, rubber hydrochloride, vinyl-vinylidine copolymers, etc.

The invention will be further described in connection with the accompanying drawings in which—

Figure 1:
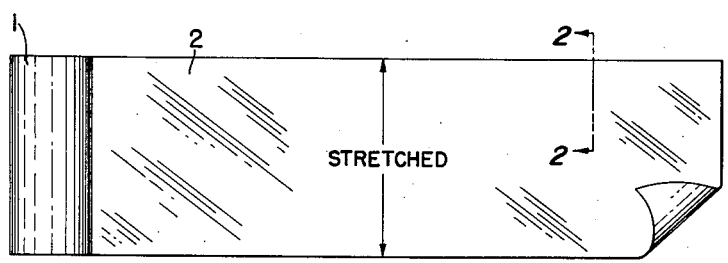
Fig. 1 shows stretched film unrolled ready for the production of the secondary closure.
Figure 2:
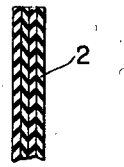
Fig. 2 is a greatly enlarged cross section on the line 2—2 of Fig. 1.

The drawings illustrate the manufacture and use of a band closure from the roll 1 of rubber hydrochloride film 2. This film is stretched laterally as indicated in Fig. 1. It is preferably built up from a number of laminae of the stretched film, each several ten-thousandths of an inch thick, as illustrated in Fig. 2. The laminated film 2 may be about two thousandths of an inch thick although the thickness may vary from, for example, five ten-thousandths up to three or four thousandths of an inch or thereabouts. The stretched film 2 may be a single ply.

Figure 3:
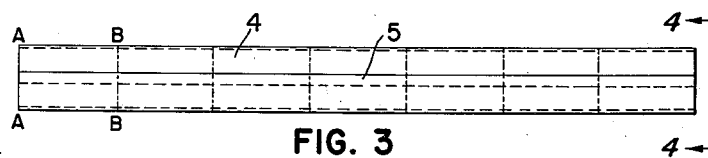
Fig. 3 shows a tube formed from the film of Fig. 1 and from which a number of secondary closures are to be formed.
Figure 4:
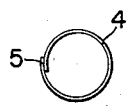
Fig. 4 is an end view of the tube on the line 4—4 of Fig. 3.
Figure 5:
Fig. 5 is an enlarged detail of the tube showing that it is formed by overlapping and cementing the edges of the film.

In order to form the band closures, this film 2 is formed into a tube and the overlapping edges are united by any suitable cement 5. Figures 3 and 4 illustrate side and end views of the resulting tube 4. Figure 5 is an enlarged end view of the overlapped cemented seal 5. Alternatively the seal may be formed by heat or a solvent. The tube is cut to lengths which are illustrated in Fig. 3 by dot-dash lines. This method of manufacturing secondary band closures is described in Mallory 2,331,794, but it has been found that the treatment of the inner surface of such a closure with a liquid which swells the rubber hydrochloride at this surface and causes it to shrink tighter and/or bind tighter to the neck of the bottle or other container, makes the secondary closure much more tamper proof than the secondary closure which is applied without first being treated with a swelling agent.

Figure 6:
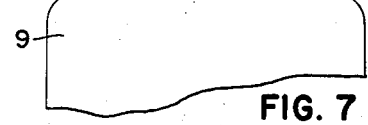
Fig. 6 shows the dipping of the completed secondary band closure in a swelling agent.

The secondary closure 7 of Fig. 6 is dipped in a volatile organic swelling agent 8 such as xylene, benzene, toluene, chlorinated hydrocarbons, etc. Instead of dipping the closure in the swelling agent, it may be applied in any desired manner. Adhesives containing a band-swelling agent may be used.

Figure 7:
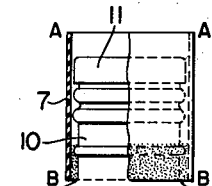
Fig. 7 shows the freshly dipped secondary closure on a bottle.

Figure 7 illustrates the application of the treated secondary closure to the bottle 9. The opening through the neck 10 is first closed with the stopper 11 or other primary closure. The neck of the bottle may be perfectly smooth, but for the purposes of this invention the neck is preferably ribbed or formed with other irregularities in the surface which assist in holding the secondary closure in place.

Figure 8:
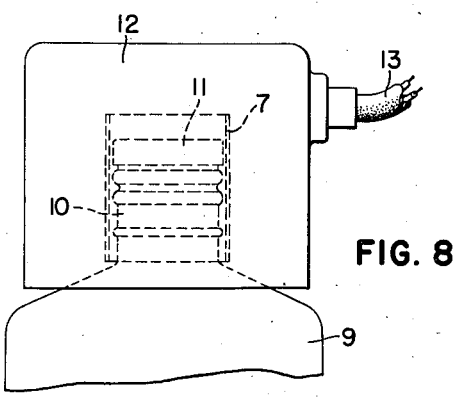
Fig. 8 illustrates the heating of the secondary closure to shrink it, to adhere the treated surface to the bottle.
Figure 9:
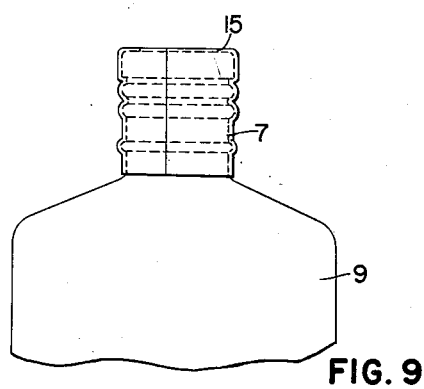
Fig. 9 illustrates the completed tamper-proof package.

In applying the secondary closure, it is dipped in the swelling agent bath 8 and then quickly placed over the neck of the bottle before it evaporates and before it shrinks the stretched film. Heat is then applied and this is preferably done by placing the bottle under a hood such as the hood 12 of Fig. 8 which is provided with electrical connections 13 which lead to heating means (not shown) under the hood. The hood may be elongated and of tunnel shape so that the bottles may be carried through it standing upright on a conveyor. When the secondary closure is heated, it shrinks circumferentially and forms a snug fit with the neck of the bottle. The top edge 15 of the secondary closure which projects above the cork shrinks down on to the top of the bottle as illustrated in Fig. 9.

The swelling agent on the surface of the secondary closure softens the film and dissolves or swells it to a limited extent. Shrinkage then occurs. On heating, the band shrinks more and the treated surface binds tighter to the bottle neck. The swelling of the film by the liquid makes the treated surface tacky when heated so that it adheres to the neck of the bottle when the band closure is shrunk into place. The swelling agent is an important aid in the shrinking process because the bands tighten permanently and the treated shrunk band does not loosen from the neck of the container on aging. Untreated bands adhere tightly immediately after shrinking but expand and loosen soon thereafter.

Heating the secondary closure, after it has been placed around the neck of the bottle, shrinks it into snug contact with the neck, accelerates the activation of the film by the swelling agent and effects an adhesive bond with the surface of the neck, and assists in the evaporation of the excess liquid if volatile.

Instead of treating all or a part of the inner surface of the closure with a swelling agent it may be coated with an adhesive which when dried is non-tacky at room temperature, but which softens and becomes adhesive on heating. However, this method is not included as a part of this invention.

The invention is not limited to the particular embodiments disclosed, but is defined in the following claims.

What I claim is:

1. The method of applying a secondary band closure to the neck opening of a container closed by a primary closure, which comprises placing over the neck a secondary band closure of circumferentially oriented heat-shrinkable plastic having an organic swelling agent therefor on at least a portion of the inner surface of the neck, and then heating the secondary closure, thereby both shrinking it permanently against the end and adhering the surface contacted by the swelling agent to the neck.

2. The method of applying a secondary closure to the neck of a bottle closed with a primary closure, which comprises treating at least a portion of the inner surface of a secondary band closure of circumferentially stretched rubber hydrochloride film with an organic swelling agent, then quickly placing it around the neck of a bottle closed with a primary closure, and then heating the secondary closure thereby shrinking it onto the bottle and adhering the treated film to the neck of the bottle.

3. The method of applying a secondary closure to the neck of a bottle closed with a primary closure, which comprises dipping one end of a secondary band closure of circumferentially stretched rubber hydrochloride film into an organic swelling agent for the rubber hydrochloride, quickly transferring this secondary closure from the swelling agent and placing it around the neck of a bottle closed with a primary closure, and then heating the secondary closure thereby shrinking it onto the bottle and adhering the treated film to the neck of the bottle.

4. The method of applying a secondary closure to the neck of a bottle closed with a primary closure, which comprises treating at least a portion of the inner surface of a secondary band closure of circumferentially stretched rubber hydrochloride film with xylene, then quickly placing it around the neck of a bottle closed with a primary closure, and then heating the secondary closure thereby shrinking it onto the bottle and adhering the treated film to the neck of the bottle.

5. The method of applying a secondary closure to the neck of a bottle closed with a primary closure, which comprises treating at least a portion of the inner surface of a secondary band closure of circumferentially stretched rubber hydrochloride film with an organic swelling agent, then quickly placing it around the neck of a bottle closed with a primary closure, and then heating the secondary closure thereby shrinking it onto the bottle whereby it does not loosen on aging.

References Cited in the file of this patent

UNITED STATES PATENTS

| Number | Name | Date |
|---|---|---|
| 1,969,453 | Churchill | Aug. 7, 1934 |
| 2,029,131 | Shoemaker | Jan. 28, 1936 |
| 2,119,901 | Beitler | June 7, 1938 |
| 2,168,651 | McCoy | Aug. 8, 1939 |
| 2,270,018 | Davis | Jan. 13, 1942 |
| 2,331,794 | Mallory | Oct. 12, 1943 |
| 2,385,257 | Cavallito | Sept. 18, 1945 |
| 2,447,983 | Little | Aug. 24, 1948 |
| 2,565,316 | Lucas et al. | Aug. 21, 1951 |

FOREIGN PATENTS

| Number | Country | Date |
|---|---|---|
| 405,953 | Great Britain | Feb. 13, 1934 |